US008049598B2

(12) United States Patent
Oakes et al.

(10) Patent No.: US 8,049,598 B2
(45) Date of Patent: Nov. 1, 2011

(54) METHODS AND APPARATUS FOR ARBITRARY ANTENNA PHASING IN AN ELECTRONIC ARTICLE SURVEILLANCE SYSTEM

(75) Inventors: Jeffrey T. Oakes, Boca Raton, FL (US); Thomas J. Frederick, Coconut Creek, FL (US); Richard L. Herring, Wellington, FL (US)

(73) Assignee: Sensormatic Electronics, LLC, Boca Raton, FL (US)

( * ) Notice: Subject to any disclaimer, the term of this patent is extended or adjusted under 35 U.S.C. 154(b) by 127 days.

(21) Appl. No.: 12/363,873

(22) Filed: Feb. 2, 2009

(65) Prior Publication Data

US 2009/0160650 A1 Jun. 25, 2009

Related U.S. Application Data

(62) Division of application No. 11/121,898, filed on May 4, 2005, now Pat. No. 7,495,565.

(60) Provisional application No. 60/570,030, filed on May 11, 2004.

(51) Int. Cl.
*H04Q 5/22* (2006.01)

(52) U.S. Cl. .................................................... 340/10.1

(58) Field of Classification Search ................ 340/10.1, 340/572.1–572.9
See application file for complete search history.

(56) References Cited

U.S. PATENT DOCUMENTS

| | | | | |
|---|---|---|---|---|
| 4,274,083 | A | 6/1981 | Tomoeda | |
| 4,679,046 | A * | 7/1987 | Curtis et al. | 342/51 |
| 6,118,378 | A * | 9/2000 | Balch et al. | 340/572.7 |
| 6,801,028 | B2 * | 10/2004 | Kernahan et al. | 323/283 |
| 6,995,672 | B1 | 2/2006 | Yones | |

* cited by examiner

*Primary Examiner* — Phung Nguyen
(74) *Attorney, Agent, or Firm* — Dean Small; The Small Patent Law Group

(57) ABSTRACT

A method for controlling electronic article surveillance (EAS) transmissions is described. The method includes calculating system parameters associated with one or more of a desired frequency a desired duty cycle, and a desired phase difference between antennas for a transmitter, and initializing a counter with a value based on the system parameters. The method also includes comparing a count from the counter to the system parameters, and modulating EAS transmission signals based on the comparison between the count and the system parameters. An EAS transmitter and an EAS system are also described.

18 Claims, 7 Drawing Sheets

METHODS AND APPARATUS FOR ARBITRARY ANTENNA PHASING IN AN ELECTRONIC ARTICLE SURVEILLANCE SYSTEM

CROSS REFERENCE TO RELATED APPLICATIONS

The present application relates to and claims priority from Provisional Application Ser. No. 60/570,030, filed May 11, 2004, titled "Arbitrary Antenna Phasing in an Electronic Article Surveillance System" and U.S. application Ser. No. 11/121,1898, filed May 4, 2005, "Methods and Apparatus for Arbitrary Antenna Phasing in an Electronic Article Surveillance System" the entire disclosure of which is hereby incorporated by reference herein in its entirety.

BACKGROUND OF THE INVENTION

1. Field of the Invention

This invention relates generally to the processing of electronic article surveillance (EAS) tag signals, and more particularly to a system and method of using phase shifting of a plurality of transmitter oscillators in a transmitter used in an EAS system.

2. Description of the Related Art

In acoustomagnetic or magnetomechanical electronic article surveillance, or "EAS," a detection system may excite an EAS tag by transmitting an electromagnetic burst at a resonance frequency of the tag. When the tag is present within an interrogation zone defined by the electromagnetic field generated by the burst transmitter, the tag resonates with an acoustomagnetic or magnetomechanical response frequency that is detectable by a receiver in the detection system.

The typical default mode of operation of these EAS systems in most countries that do not adhere to the standards promulgated by the European Telecommunications Standards Institute ("ETSI") uses phase flipping on the transmitter to produce various electromagnetic field patterns that provide for excitation of the tags in various orientations. However, the emissions standards in some countries (notably those adhering to ETSI standards) prevent the system from transmitting in certain antenna configurations with any significant current levels.

For example, a figure eight antenna configuration produces an electromagnetic field that meets ETSI standards, but tags located in certain positions and orientations within the interrogation zone may not get excited by the figure eight antenna configuration because these tags are located in "nulls" within the resultant electromagnetic field. An aiding antenna configuration produces fewer nulls, but particular current levels may result in electromagnetic field levels that do not meet the ETSI standards. Another issue is that due to mismatches in the antenna tuning, there may be phase shifts between the two antenna elements. These mismatches result in an imperfect electromagnetic field, for example, decreased power efficiency in the interrogation zone and increased emission levels in figure eight antenna configurations. Decreased power efficiency makes the excitation and subsequent detection of EAS tags within the interrogation zone more difficult. Increased emission levels may not meet ETSI standards.

BRIEF DESCRIPTION OF THE INVENTION

A method for controlling electronic article surveillance (EAS) transmissions is provided that may comprise calculating system parameters associated with one or more of a desired frequency a desired duty cycle, and a desired phase difference between antennas for a transmitter. The method may further comprise initializing a counter with a value based on the system parameters, comparing a count from the counter to the system parameters, and modulating EAS transmission signals based on the comparison between the count and the system parameters.

A transmitter for an EAS system is also provided. The EAS system may include a plurality of antennas, and the transmitter may comprise a plurality of amplifiers, each antenna configured to transmit a signal originating from a corresponding one of the amplifiers, and a processor configurable to adjust a phase shift between the outputs of the amplifiers based on a received value.

An EAS system is provided that may comprise at least one EAS tag, a plurality of antennas, at least one receiver configured to utilize the antennas to receive emissions from the tag, and at least one transmitter. The transmitter may be configured to transmit signals from the antennas to cause the tag to resonate when the tag is in a vicinity of the transmitter. Each transmitter may comprise a plurality of antennas, each of which may be configured to transmit a signal originating from a corresponding amplifier. The transmitter may be configurable to adjust a phase between outputs of the amplifiers.

BRIEF DESCRIPTION OF THE DRAWINGS

For a better understanding of the invention, together with other objects, features and advantages, reference should be made to the following detailed description which should be read in conjunction with the following figures wherein like numerals represent like parts.

DETAILED DESCRIPTION OF THE INVENTION

For simplicity and ease of explanation, the invention will be described herein in connection with various embodiments thereof. Those skilled in the art will recognize, however, that the features and advantages of the invention may be implemented in a variety of configurations. It is to be understood, therefore, that the embodiments described herein are presented by way of illustration, not of limitation.

Figure 1:
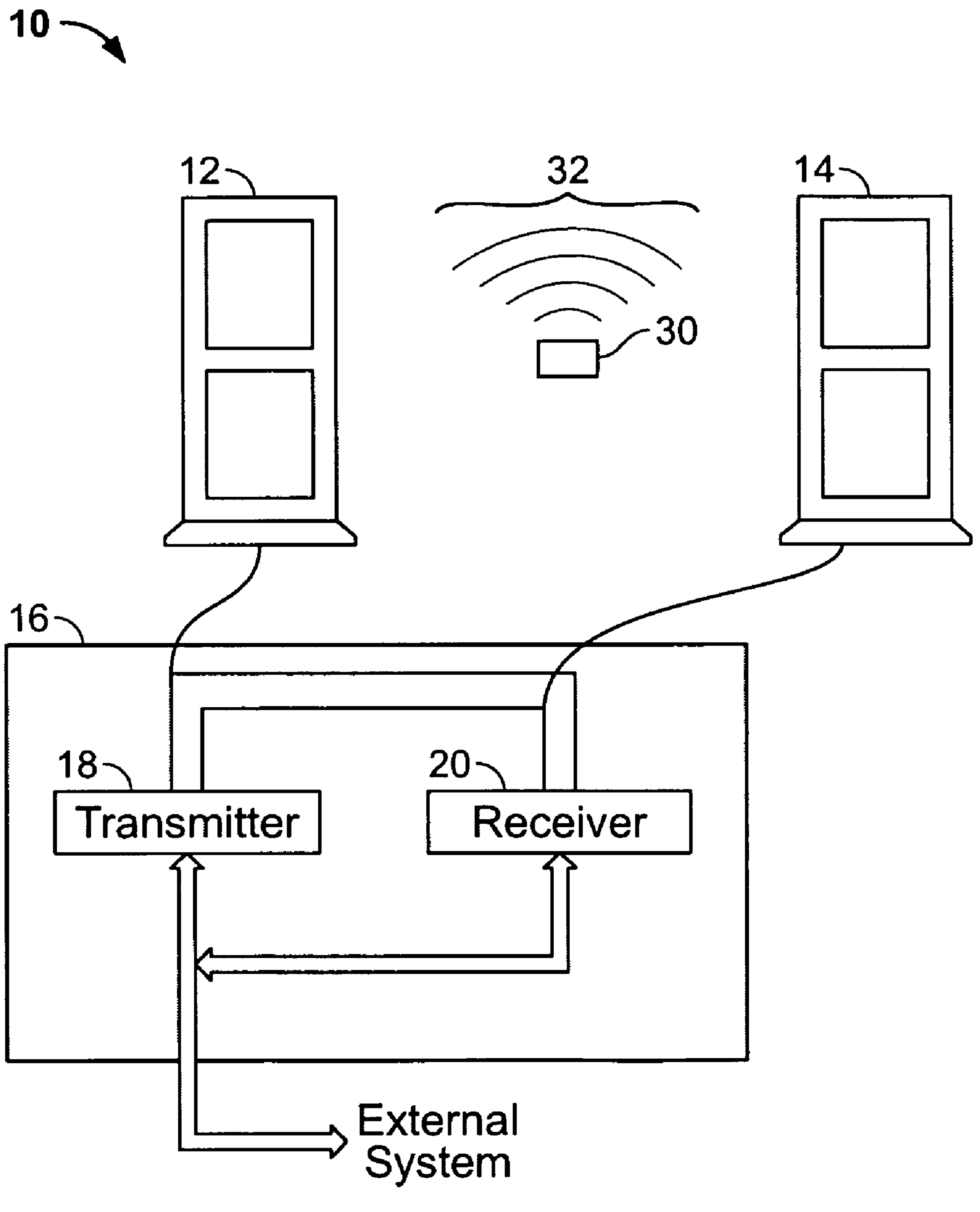
FIG. 1 is a block diagram of an electronic article surveillance (EAS) system.

FIG. 1 illustrates an EAS system 10 that may include a first antenna pedestal 12 and a second antenna pedestal 14. The antenna pedestals 12 and 14 may be connected to a control unit 16 that includes a transmitter 18 and a receiver 20. The control unit 16 may be configured for communication with an external device, for example, a computer system controlling or monitoring operation of a number of EAS systems. In addition, the control unit 16 may be configured to control transmissions from transmitter 18 and receptions at receiver 20 such that the antenna pedestals 12 and 14 can be utilized for both transmission of signals for reception by an EAS tag 30 and reception of signals generated by the excitation of EAS tag 30. Specifically such receptions typically occur when the EAS tags 30 are within an interrogation zone 32, which is generally between antenna pedestals 12 and 14. System 10 is representative of many EAS system embodiments and is provided as an example only. For example, in an alternative embodiment, control unit 16 may be located within one of the antenna pedestals 12 and 14. In still another embodiment additional antennas that only receive signals from the EAS tags 30 may be utilized as part of the EAS system. Also a single control unit 16, either within a pedestal or located separately may be configured to control multiple sets of antenna pedestals.

Figure 2:
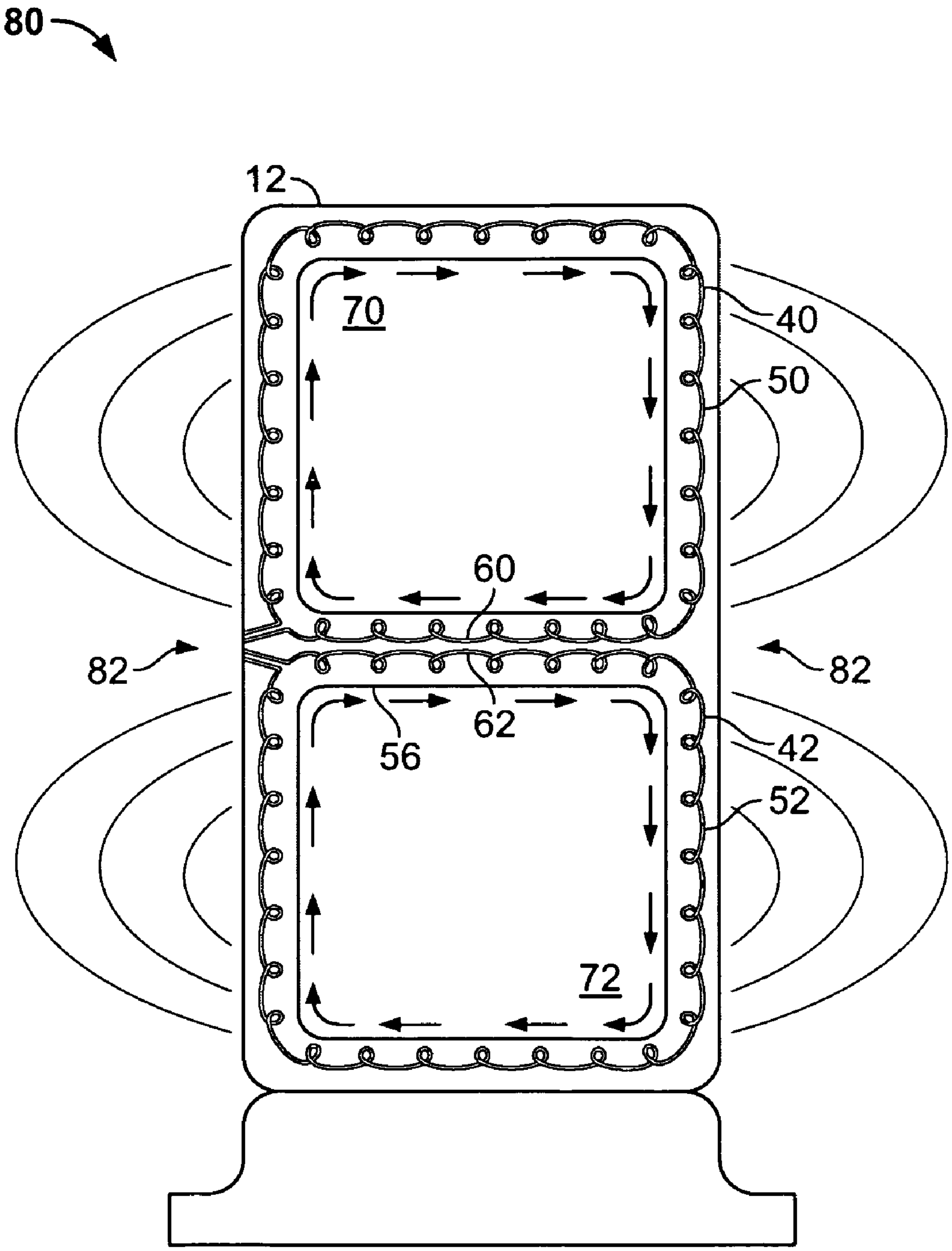
FIG. 2 is a front view of an antenna pedestal for an EAS system illustrating an aiding current flow through the antenna elements therein, and a portion of an electromagnetic field resulting from the aiding current flows.

In one embodiment, antenna pedestals 12 and 14 each include two antenna elements. FIG. 2 is an illustration of an antenna pedestal, for example antenna pedestal 12 that may include two antenna elements 40 and 42 therein. In the illustrated embodiment, antenna elements 40 and 42 may be provided within antenna pedestal 12 in a loop configuration. In this configuration, and as illustrated, each antenna loop 50 and 52 may be substantially rectangular. Antenna pedestal 12 includes a central member 56 through which a portion 60 of antenna loop 50 may pass. A portion 62 of antenna loop 52 may also pass through central member 56. As such, portion 60 and portion 62 can be located near enough to one another that an electromagnetic field caused by current passing through antenna loop 50 is affected by an electromagnetic field caused by current passing through antenna loop 52. Current arrows 70 for antenna loop 50 and current arrows 72 for antenna loop 52 illustrate that antenna pedestal 12 may be configured in a configuration that is commonly referred to as an aiding configuration.

In the aiding configuration, the current through antenna loops 50 and 52 is generally traveling in the same direction, except for portions 60 and 62 as shown. In the aiding configuration, the currents flowing through antenna loops 50 and 52 are typically considered to be in phase. An aiding configuration current flow through antenna loops 50 and 52 results in a vertical component of electromagnetic field 80 having a general shape and nulls 82 as is shown in FIG. 2.

Figure 3:
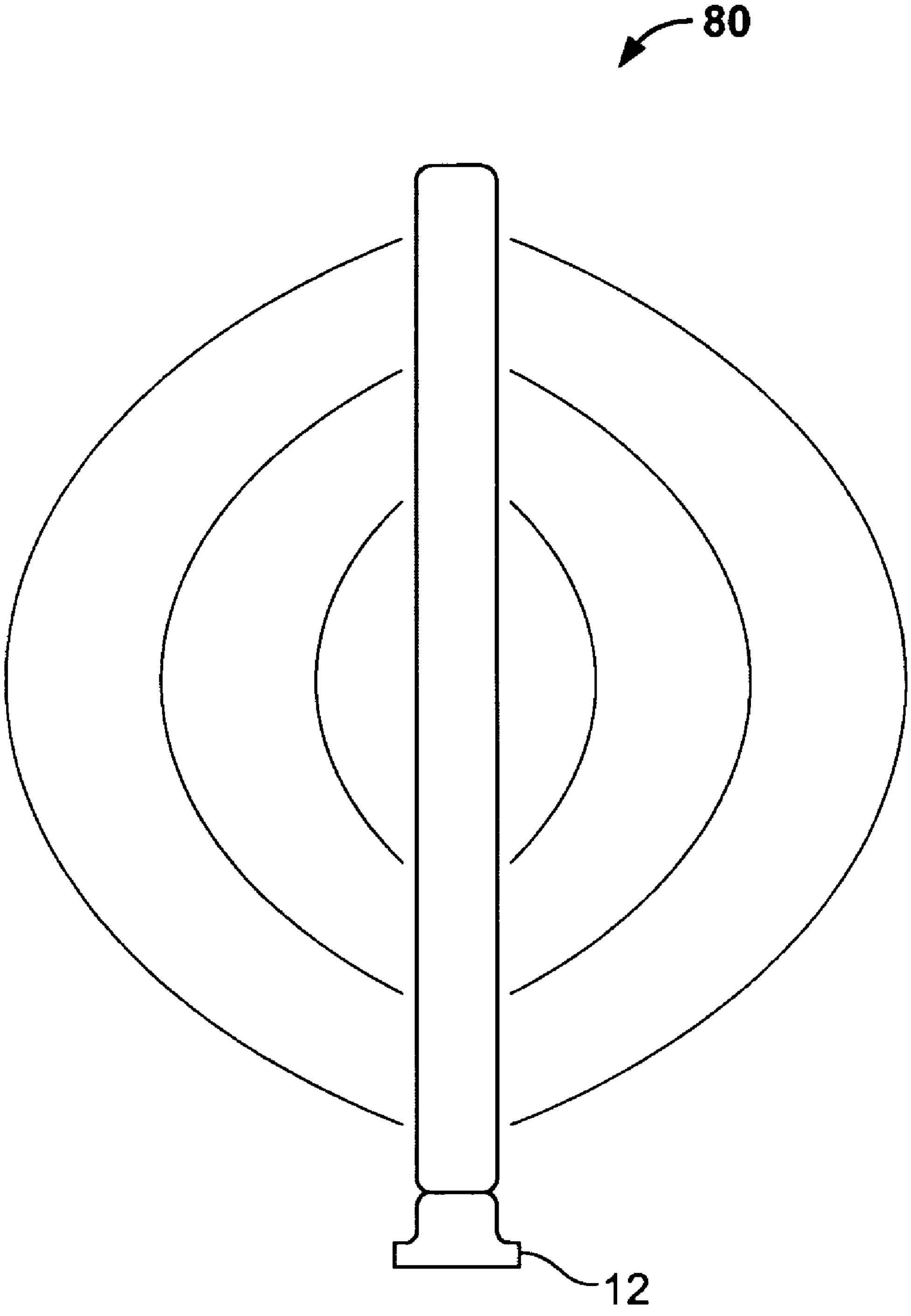
FIG. 3 is a side view of the antenna pedestal of FIG. 2 illustrating another portion of the electromagnetic field resulting from the aiding current flows.

FIG. 3 is a side view of the antenna pedestal 12 illustrating the horizontal component of the electromagnetic field 80 that extends from antenna pedestal 12 when operating in an aiding configuration. As illustrated, the horizontal component includes no nulls from a top to bottom of antenna pedestal 12. This horizontal component is representative of an electromagnetic field that may not meet ETSI standards.

Figure 4:
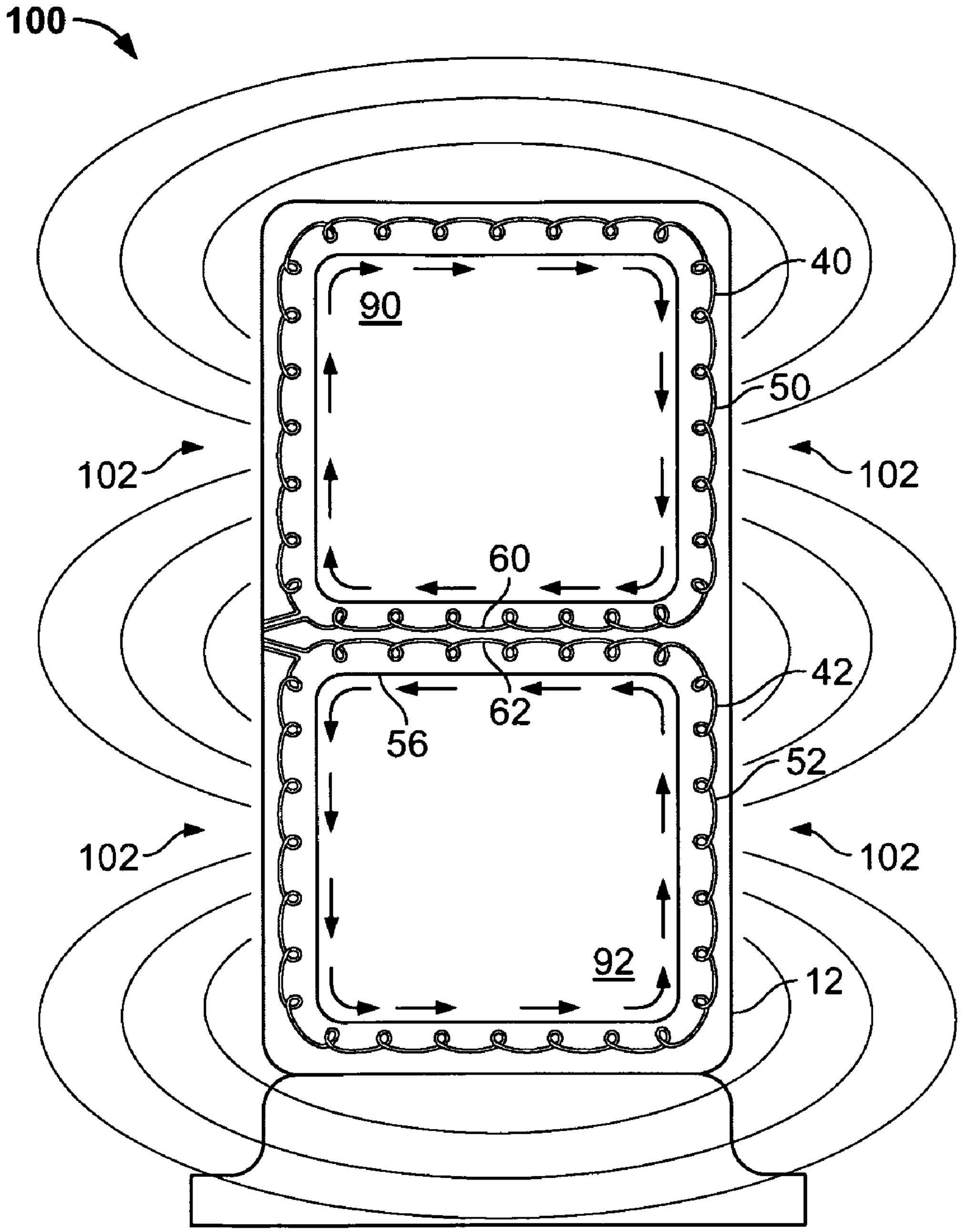
FIG. 4 is a front view of an antenna pedestal for an EAS system illustrating a figure eight current flow through the antenna elements therein, and a portion of an electromagnetic field resulting from the figure eight current flows.

FIG. 4 is an illustration of an antenna pedestal, for example antenna pedestal 12, that also may include two antenna elements 40 and 42 therein and configured as described above. Specifically the two antenna elements 40 and 42 are configured as antenna loops 50 and 52. More specifically current arrows 90 for antenna loop 50 and current arrows 92 for antenna loop 52 illustrate that antenna pedestal 12 may be configured in a configuration that is commonly referred to as a figure eight configuration. In the figure eight configuration, the current through antenna loops 50 and 52 is generally traveling in the opposite directions, except for portions 60 and 62 as shown. In the figure eight configuration, the currents passing through antenna loops 50 and 52 are typically considered to be 180 degrees out of phase. A figure eight configuration current flows through antenna loops 50 and 52 results in a electromagnetic field 100 whose general shape is shown in FIG. 4 and that includes nulls 102 as shown in FIG. 4.

Figure 5:
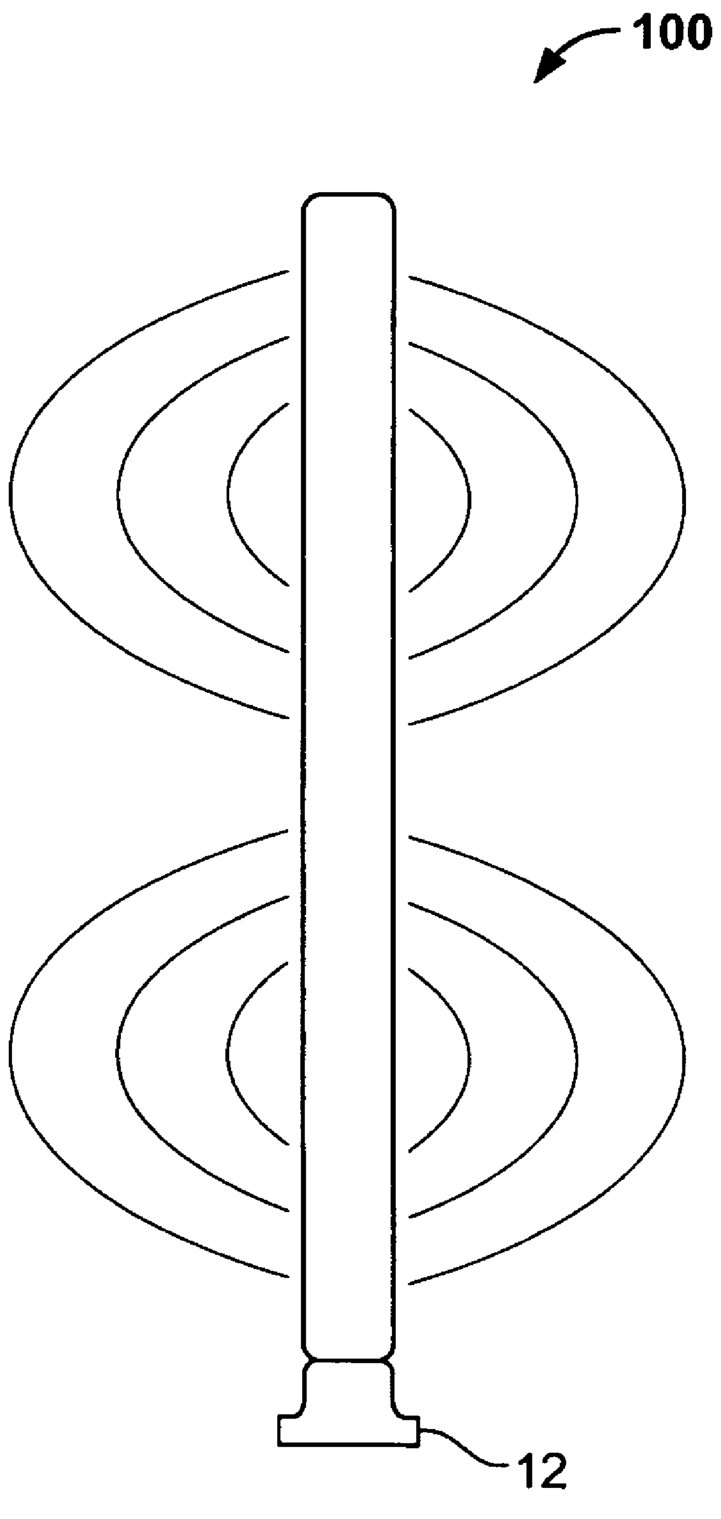
FIG. 5 is a side view of the antenna pedestal of FIG. 4 illustrating another portion of the electromagnetic field resulting from the figure eight current flow.

FIG. 5 is a side view of the antenna pedestal 12 illustrating the horizontal component of the electromagnetic field 100 that extends from antenna pedestal 12 when operating in a figure eight configuration. As shown, the horizontal component may include a null approximate a center of antenna pedestal 12.

Switching the current flow through antenna loops 50 and 52 back and forth from an aiding configuration to a figure eight configuration is sometimes referred to as phase flipping. Phase flipping is utilized to produce changes to the electromagnetic field such that EAS tag 30 (shown in FIG. 1) is excited regardless of its physical orientation.

However, as described above, emissions standards in countries adhering to the European Telecommunications Standards Institute ("ETSI") standards prevent the antenna pedestal 12 from transmitting in an aiding configuration with any significant current levels. Therefore, the electromagnetic field (e.g., electromagnetic field 80 shown in FIGS. 2 and 3) may not be strong enough to excite EAS tags 30 in certain orientations within the interrogation zone 32. Further, while a figure eight configuration meets ETSI standards, some EAS tag 30 positions and orientations within the interrogation zone 32 may not be excited by the electromagnetic field 100 because these EAS tags 30 may pass through nulls 102 in the electromagnetic field 100 present within the interrogation zone 32. There also may be undesirable phase shifts between the antenna loops 50 and 52. These phase shifts may be due to mismatches in antenna tuning between the two antenna loops 50 and 52, which results in deviations from the desired electromagnetic fields 80 and 100. Such mismatches may also result in a significant loss of symmetry between the fields generated by the antenna loops 50 and 52, resulting in increased emissions that may not meet ETSI standards.

Figure 6:
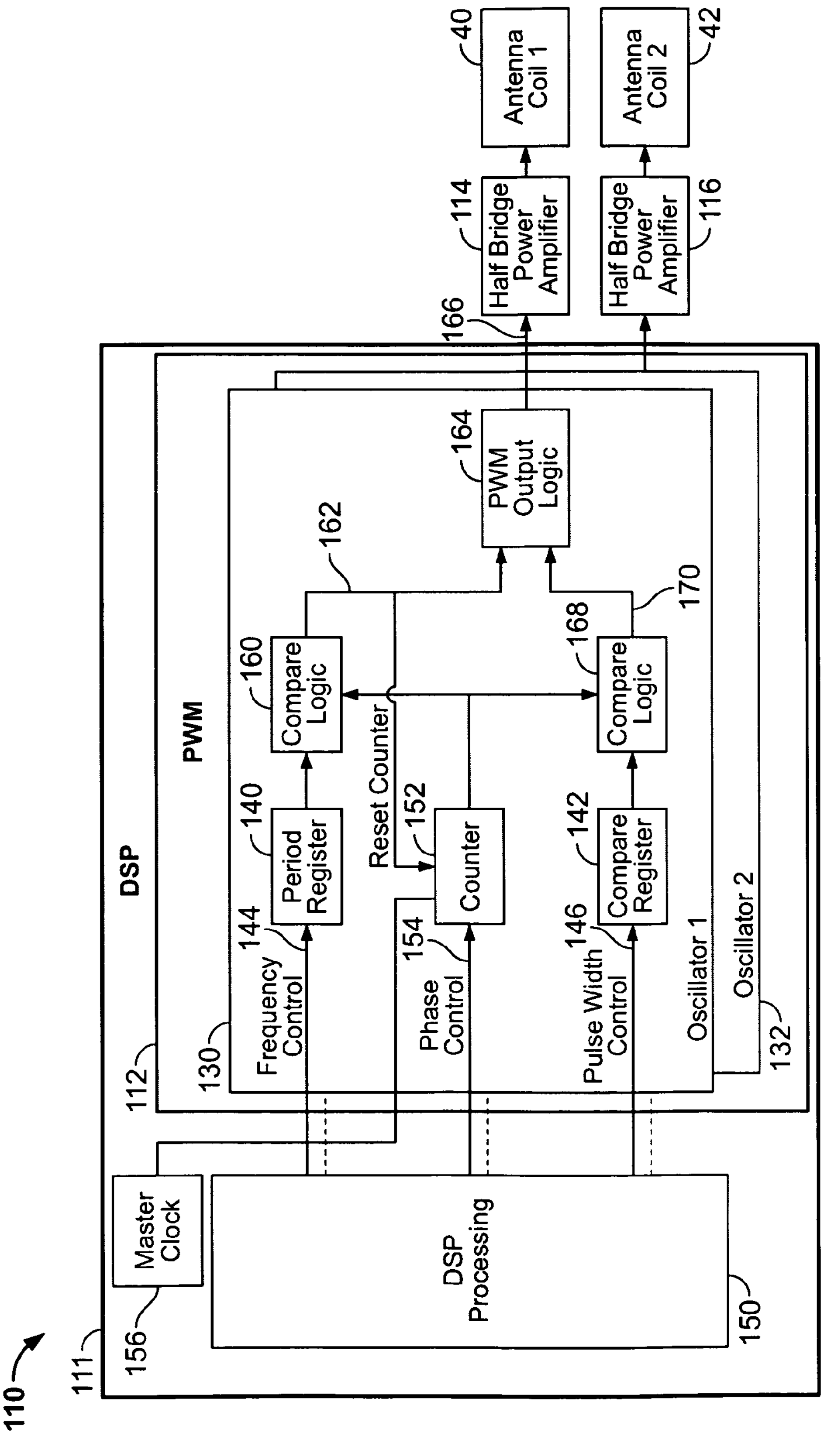
FIG. 6 is a block diagram of a portion of a transmitter for an EAS system.

FIG. 6 is a block diagram of a portion of a transmitter 110 for an EAS system such as EAS system 10. The transmitter 110 may include a digital signal processor 111 having a pulse width modulator (PWM) 112 to provide signals to amplifiers 114 and 116. These signals may be then transmitted through antenna elements 40 and 42, respectively. It is to be understood that the embodiments described herein may also be accomplished utilizing a DSP that interfaces to a PWM module that is external to the DSP.

PWM 112, and thus transmitter 110 may be configured, as further described below, to improve the detection of surveillance tags (e.g., EAS tags 30 shown in FIG. 1), which may be located in "nulls" in the electromagnetic fields generated by, for example, EAS system 10. In addition, PWM 112 may be configured to compensate for mismatches in the tuning of antenna elements 40 and 42 that may result in phase shifts between the various antenna elements 40 and 42, which can result in an imperfect electromagnetic fields and decreased power efficiency within the interrogation zone 32 (shown in FIG. 1). Further, transmitter 110 is capable of operation under the ETSI standards described above.

As shown in FIG. 6, PWM 112 includes a plurality of control oscillators 130 and 132 that may be configurable such that antenna elements 40 and 42 embody for example, a figure eight configuration, an aiding configuration, or other arbitrary phase configuration. These various configurations can result in an electromagnetic field emanating from antenna elements 40 and 42 that is applicable for different EAS system installations. Arbitrary phase configurations are desirable, for example, to address impedance differences and transmission cable lengths that are installation dependent and to reduce the occurrences of nulls within an interrogation zone.

In the illustrated embodiment, each oscillator 130 and 132 may be incorporated within the PWM 112 or similar processing circuitry that includes a period register 140 and a compare register 142 for receiving a frequency control signal 144 and a pulse width control signal 146, respectively. The frequency control signal 144 and the pulse width control signal 146 may be generated within the DSP 111, for example, using program control algorithms contained within a processing portion 150 of the DSP 111 and are sometimes referred to as system parameters. The PWM 112 may also include a counter 152, which receives phase control signals 154 from the processing portion 150 of the DSP 111.

In one embodiment period register 140 and frequency control signal 144 may be utilized to generate an average frequency for the modulated transmissions from PWM 112. More specifically a desired transmission frequency may not be an exact multiple of a master clock 156 within the DSP 111 that is supplied to the period register 140, the compare register 142, and the counter 152 of both oscillators 130 and 132. Therefore, to achieve the desired frequency on average, the frequency control signal 144 may be configured to dither a value within the period register 140, for example, utilizing software within the DSP processing portion 150. As used herein, the term "dither" is understood to mean switching back and forth between two or more values. By dithering the values within the period register 140, the frequency output by the period register 140 changes. These frequency outputs are multiples of the frequency of the master clock 156. When these frequency outputs are averaged, the average is equal to the desired transmission frequency.

As an example, in order to achieve a desired transmission frequency that is equivalent of 2500.6 master clock cycles, the period register 140 may be dithered back and forth between 2500 master clock cycles two times and 2501 clock cycles three times. For the 2500 master clock cycle portion of the example, once the counter 152 has counted 2500 clock cycles, compare logic 160, which monitors the output of the counter 152 and the period register 140 output, outputs a signal 162. Signal 162 may be used to reset the counter 152 and may also be applied to PWM output logic 164. Pulse width control signal 146 and compare register 142 are configured to control a duty cycle of the PWM output 166.

To control the duty cycle, the output of the counter 152 and output of compare register 142 may be compared by compare logic 168. The output 170 of the compare logic 168 may also be input to PWM output logic 164 as a set and clear signal. Continuing with the above example, for a 25% duty cycle PWM output, the pulse width control signal could set the compare register 142 such that after 625 clock cycles, output 170 of compare logic 168 changes state (setting PWM output logic 164) and remain in that changed state until counter 152 is reset (clearing PWM output logic 164). In other words, the width of the power amplifier drive signal (output 166) may be controlled by adjusting the compare register 142.

To provide the arbitrary phase antenna pattern between antenna elements 40 and 42 the counters (e.g., counter 152) in each of the oscillators 130 and 132 may be initialized with an offset relative to one another. For example, if the period of the oscillator 130 is to be 1000 cycles of master clock 156, then implementing a phase shift of 45 degrees would require that one of the oscillators be initialized with a counter value of zero, while the other oscillator be initialized with a counter value of 125. The 125 value is the period divided by the fraction of 360 degrees or 1000×(360/45)=125. The offset value of 125 may be reduced or increased based on mismatches in the tuning between antenna elements 40 and 42 and variances in the lengths between the amplifiers 114 and 116 and the corresponding antenna elements 40 and 42.

Based on the offset value, the output signals 162 from the compare logic of each oscillator 130 and 132 may be offset from one another. Likewise, the output signals 170 from the compare logic 168 of each oscillator 130 and 132 may be offset. These output signals 162 and 170 may be utilized within oscillator 130 and 132, respectively, to control the pulse width modulator output logic 164. Therefore, the oscillators 130 and 132 generate corresponding offset pulse modulated signal bursts. The offset pulse modulated signal bursts generated by each oscillator 130 and 132 may then be amplified by the respective amplifiers 114 and 116 to drive each corresponding antenna element 40 and 42.

These various embodiments provide significant advantages to the operation of EAS transmitters in that arbitrary phase shifts between multiple transmit channels driving, for example, antenna elements 40 and 42 of an antenna pedestal may be provided. One implementation allows for phase shifts between the antenna elements 40 and 42 ranging from about zero degrees to about 180 degrees. A phase difference of about 180 degrees between antenna elements 40 and 42 is effective for reducing emissions, but results in a particular set of nulls in the electromagnetic field that emanates from antenna elements 40 and 42. A phase difference of about zero degrees between antenna elements 40 and 42 results in a spatially different and generally smaller set of nulls, however emissions are higher. Therefore selection of a phase shift between antenna elements 40 and 42 somewhere between zero degrees and 180 degrees may result in a null set smaller than the nulls produced with a 180 phase shift, while still having an emission level within ETSI standards.

With a phase shift of less than 180 degrees, performance of the EAS transmitter 110 may be increased because excitation of EAS tags 30 becomes less dependent on a correlation between the electromagnetic fields generated and orientations of the EAS tags 30. In other words, an arbitrary phase difference between antenna elements 40 and 42 may be utilized to eliminate, or at least reduce nulls in the generated electromagnetic fields. One embodiment of an EAS transmitter that may be implemented is a quadrature transmitter that has a 90 degree phase shift between antenna elements 40 and 42. Such an embodiment may eliminate the need to phase flip the transmissions (switching back and forth between aiding and figure eight configurations) as is performed in some known applications. Eliminating phase flipping of EAS transmitters also reduces memory requirements of a controller of the EAS transmitter.

Figure 7:
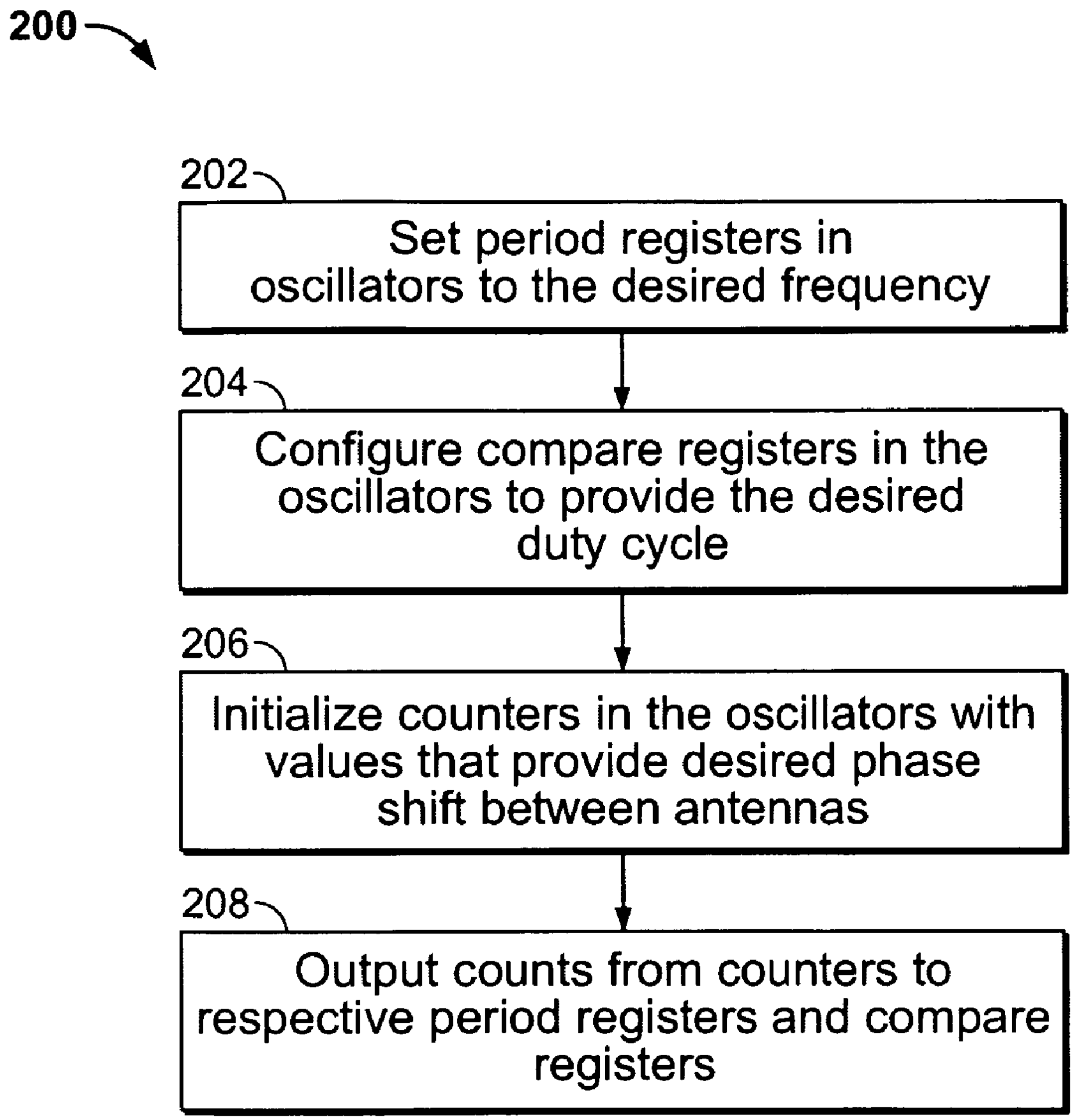
FIG. 7 is a flowchart illustrating operation of a portion of the transmitter of FIG. 6.

FIG. 7 is a flowchart 200 illustrating processes embodied within transmitter 110 that achieve the above described arbitrary phase shifting within the EAS transmitter. First, at 202, period registers 140 of each oscillator 130 and 132 in the PWM 112 may be set using a system parameter that corresponds to a desired frequency. Setting the period registers 140 with system parameters that result in the desired frequency output from the PWM 112 may include determining the number of cycles of master clock 156 to be counted within the compare logic 160. If the number of cycles of master clock 156 is not an exact multiple of the master clock frequency setting the period registers 140 may include dithering the values set within the period registers 140 such that an average frequency output of the PWM 112 is at the desired frequency. Once the count of master clock 156 cycles is equal to the set value, a counter within each oscillator 130 and 132 may be reset, and the counter 152 may begin again to count to the set value, which may be the same as previously set or which has been dithered to a new value as described above.

At 204, compare registers 142 within the oscillators 130 and 132 may be configured with a value such that an output of the PWM is at a desired duty cycle. The configuration may be based on the number of clock cycles in the desired PWM frequency. For example, for a 50% duty cycle, the compare registers 142 are configured at 204 with a count value that is one-half of the count value set at 202 within the period registers.

At 206, counters may be initialized within the oscillators 130 and 132 and counts may be output, at 208, to both the period registers 140 and the compare registers 142 of each corresponding oscillator 130 and 132. To shift a phase of the transmissions between the respective antennas, the counters may be initialized at 206 with different values as above described. The counter 152 may then be started.

The embodiments described herein provide arbitrary phase shifts between EAS transmitter antennas by using two or more independent transmitter oscillators for the different transmitter channels. The independent transmitter oscillators allow arbitrary phase shifts between the channels while still operating, and transmitting, at the same frequency. As the period registers are also programmable, the transmitter oscillators are also configurable to allow arbitrary frequency shifts between the transmitter channels.

In the above described exemplary embodiments, the transmitter oscillators may be digitally implemented numerically controlled oscillators (NCOs) that are included as part of the pulse width modulator control circuitry that is contained within certain digital signal processors. As described above, a phase shift may be implemented by initializing the count registers of the two separate oscillators with an offset relative to one another. Transmit frequencies may also be programmed for each oscillator by changing the period registers of the oscillators. Also, while described in terms of a digital signal processor, the above described embodiments may also be implemented in other programmable devices and in discrete circuits.

It is to be understood that variations and modifications of the present invention can be made without departing from the scope of the invention. It is also to be understood that the scope of the invention is not to be interpreted as limited to the specific embodiments disclosed herein, but only in accordance with the appended claims when read in light of the forgoing disclosure.

What is claimed is:

1. A transmitter for an EAS system, the EAS system including a plurality of antennas, said transmitter comprising:
- a plurality of amplifiers, each of the amplifiers configured to generate a modulated signal that is to be transmitted by a corresponding one of the antenna; and
- a processor having counters, the processor configurable to initialize the counters based on system parameters and configurable to adjust a phase shift between the modulated signals generated by said amplifiers based on counts from the counters and the system parameters.

2. The transmitter according to claim 1 wherein said processor comprises a digital signal processor including at least one pulse width modulator to generate the modulated signals.

3. The transmitter according to claim 1 wherein said processor comprises a digital signal processor including at least one pulse width modulator, said pulse width modulator comprising at least two oscillator circuits therein, said oscillator circuits configurable to output the modulated signals having the phase shift therebetween.

4. The transmitter according to claim 1 wherein said counters are associated with each of the amplifiers, the processor modulating the modulated signals based on comparisons of the counts from the counters and the system parameters.

5. The transmitter according to claim 1 wherein said processor comprises an oscillator circuit with a compare register configurable with one or more values that set a duty cycle, said oscillator circuit configured to combine a period value with the duty cycle, to form a combination configured to be input to a corresponding one of said amplifiers.

6. The transmitter according to claim 1 wherein said processor comprises a pulse width modulator and a master clock, said pulse width modulator comprising at least two oscillator circuits therein, wherein each of said oscillator circuits comprises a one of the counters configured to be initialized with a value based on the phase shift between said antennas, said counter configured to provide a count signal for said oscillator.

7. The transmitter according to claim 1 wherein said processor comprises a plurality of corresponding registers and counters, said registers configured to receive an input value that defines a period for the output of said amplifier, said counters configured to reset when a count value of the counters is equal to the input value.

8. A transmitter for an EAS system, the EAS system including a plurality of antennas, said transmitter comprising
- a plurality of amplifiers, each of the amplifiers configured to generate a modulated signal that is to be transmitted by a corresponding one of the antenna; and
- a processor configurable to adjust a phase shift between the modulated signals generated by said amplifiers based on system parameters, wherein said processor comprises a plurality of counters, said counters configured to receive a corresponding plurality of phase control signals that define the phase shift between the modulated signals output by said amplifiers.

9. A transmitter for an EAS system, the EAS system including a plurality of antennas, said transmitter comprising:
- a plurality of amplifiers, each of the amplifiers configured to generate a modulated signal that is to be transmitted by a corresponding one of the antenna and
- a processor configurable to adjust a phase shift between the modulated signals generated by said amplifiers based on system parameters, wherein said processor comprises a master clock and an oscillator circuit with a period register, the processor loading the period register with period values and switching back and forth between at least two period values loaded into the period register to cause the oscillator circuit to output a desired average transmission frequency that is not a multiple of a frequency of the master clock.

10. An electronic article surveillance (EAS) system comprising:
- at least one EAS tag;
- a plurality of antennas;
- at least one receiver configured to utilize said antennas to receive emissions from said tag; and
- at least one transmitter configured to transmit signals from said antennas to cause said tag to resonate when said tag is in a vicinity of said transmitter, each of said transmitters comprising a plurality of amplifiers, each of the amplifiers configured to generate a modulated signal that is to be transmitted by a corresponding one of the antenna; and
- a processor configurable having counters, the processor configurable to initialize the counters based on system parameters and to adjust a phase shift between the modulated signals generated by said amplifiers based on counts from the counters and the system parameters.

11. The EAS system according to claim 10 wherein said processor comprises a plurality of counters, said counters configured to receive a corresponding plurality of phase control signals that define the phase shift between the modulated signals output by said amplifiers.

12. The EAS system according to claim 10 wherein said processor comprises a digital signal processor including at least one pulse width modulator to generate the modulated signals.

13. The EAS system according to claim 10 wherein said processor comprises a digital signal processor including at least one pulse width modulator, said pulse width modulator comprising at least two oscillator circuits therein, said oscillator circuits configurable to output the modulated signals having the phase shift therebetween.

14. The EAS system according to claim 10 wherein said counters are associated with each of the amplifiers, the processor modulating the modulated signals based on comparisons of counts from the counters and the system parameters.

15. The EAS system according to claim 10 wherein said processor comprises a master clock and an oscillator circuit with a period register, the processor loading the period register with period values and switching back and forth between at least two period values loaded into the period register to cause the oscillator circuit to output a desired average transmission frequency that is not a multiple of a frequency of the master clock.

16. The EAS system according to claim 10 wherein said processor comprises a pulse width modulator and a master clock, said pulse width modulator comprising at least two oscillator circuits therein, wherein each of said oscillator circuits comprises a counter configured to be initialized with a value based on the phase shift between said antennas, said counter configured to provide a count signal for said oscillator.

17. The EAS system according to claim 10 wherein said processor comprises a plurality of corresponding registers and counters, said registers configured to receive an input value that defines a period for the output of said amplifier, said counters configured to reset when a count value of the counters is equal to the input value.

18. An EAS system, the EAS system including a plurality of antennas, said transmitter comprising:

a plurality of amplifiers, each of the amplifiers configured to generate a modulated signal that is to be transmitted by a corresponding one of the antenna; and a processor configurable to adjust a phase shift between the modulated signals generated by said amplifiers based on system parameters, wherein said processor comprises an oscillator circuit with a compare register configurable with one or more values that set a duty cycle, said oscillator circuit configured to combine a period value with the duty cycle, to form a combination configured to be input to a corresponding one of said amplifiers.

* * * * *